Jan. 11, 1938.   W. P. ZIMMERMAN ET AL   2,105,174
METHOD OF MANUFACTURING MULTIPART GLASS ARTICLES
Filed May 20, 1936
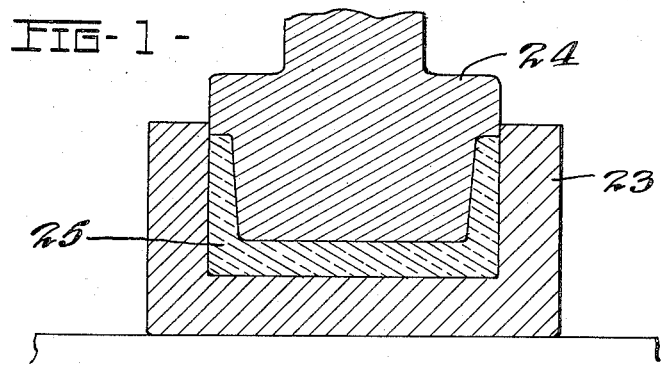
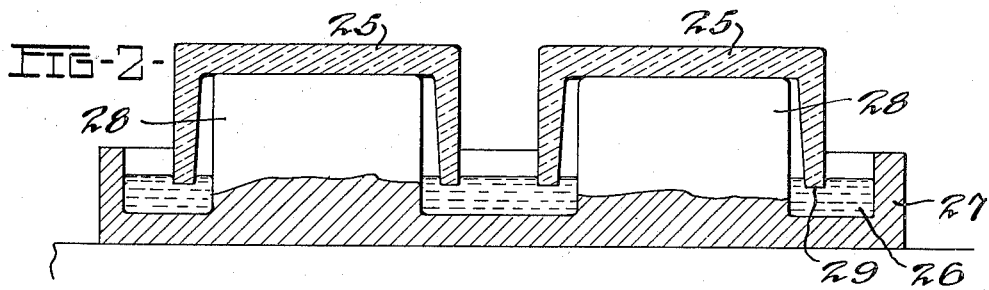
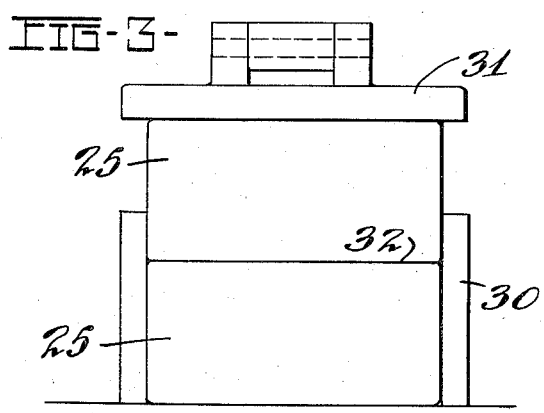
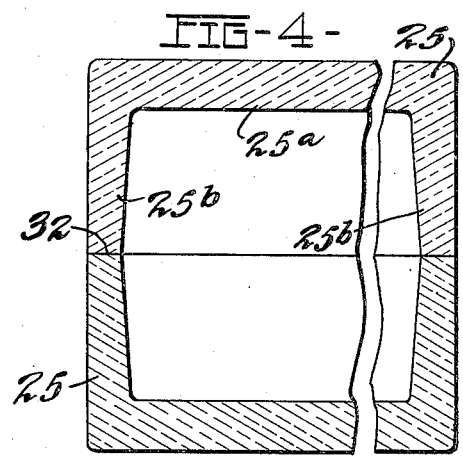
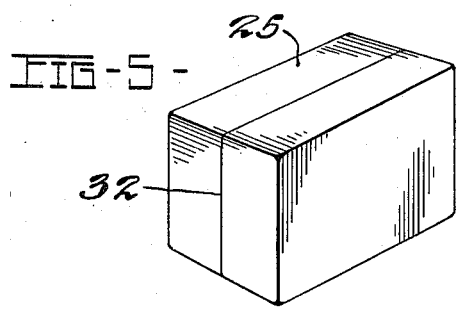
W. P. Zimmerman
M. K. Holmes,
INVENTORS
BY *Rule & Hoge*
ATTORNEYS Patented Jan. 11, 1938

2,105,174

UNITED STATES PATENT OFFICE 2,105,174

METHOD OF MANUFACTURING MULTIPART GLASS ARTICLES

Willard P. Zimmerman and Minot K. Holmes, Muncie, Ind., assignors to Owens-Illinois Glass Company, a corporation of Ohio Application May 20, 1936, Serial No. 80,826

1 Claim. (Cl. 49—82)

The present invention relates to improvements in methods of manufacturing multi-part glass articles and is particularly concerned with the production of hollow hermetically sealed building blocks.

An object of the present invention is the construction of a hollow glass building block from molded sections which are united while hot by a glass-to-glass bond. To this end the block is formed from molded sections which may be united prior to any great loss of the heat present in the glass at the completion of the molding operation.

Another object of the present invention is the provision of a novel and improved method for effecting a glass-to-glass bond between molded glass parts which when assembled, produce a hollow building block or other article. To this end the invention contemplates, in so far as the manufacture of a hollow building block is concerned, the molding of sections to be united and a localized application of intense heat to certain surface areas whereby such areas are rendered sufficiently plastic to insure adhesion thereof to each other upon assembly.

A further object is the provision of a novel method of manufacturing hollow building blocks in which certain edge portions of block sections to be united, are brought to the desired temperature and degree of plasticity by dipping them into a molten bath of material which will not adhere to the glass but will operate effectively to bring about the necessary conditions in the glass at and in proximity to those areas which are to be bonded together.

It is also an object to provide a method facilitating rapid heating of a localized area of glass block sections without the necessity for excessively heating the remaining portions. Thus, warpage and cracking of the block sections may be avoided.

Other objects will be in part apparent and in part pointed out.

In the drawing:

Fig. 1 is a fragmentary sectional view illustrating an initial step in the molding of one section of a hollow glass building block.

Fig. 2 is a fragmentary sectional view illustrating the succeeding step in which the surface areas to be united, are heated by being dipped into a bath of molten material.

Fig. 3 is an elevational view illustrating the final assembly operation in which the two block sections are brought together under pressure.

Fig. 4 is a fragmentary detail sectional view of the assembled block.

Fig. 5 is a detail perspective view of the completed block.

While the present method may well be employed in the manufacture of various multi-part glass articles, it is illustrated herein in connection with the production of hermetically sealed hollow glass building blocks. The block disclosed is of rectangular form and consists of two cup-like sections 25 or halves each of which is produced from a measured quantity of molten glass which is deposited in a suitable mold 23 and pressed to the desired shape by means of a plunger 24.

Each section includes a bottom wall $25^a$ and interconnected side walls $25^b$, said bottom wall providing one exposed face of the completed block. In the assembly of a block, two sections 25 have their free edge portions 29 bonded together to provide a hermetically sealed joint 32.

A glass-to-glass bond between the edge portions 29 of the block sections may be obtained by uniting the sections immediately after their removal from the mold and while still sufficiently hot and plastic to adhere to each other under pressure or by a localized application of intense heat at the edge portions which will render the latter sufficiently plastic to insure adhesion of these portions to each other when the halves are brought together under pressure. Such localized heating may well be and preferably is obtained by dipping said edge portions into a bath of molten material which will not adhere to the glass and is of sufficiently high temperature to render said edge portions quite plastic. The temperature of this bath may vary through a comparatively wide range being dependent entirely upon the melting point of the particular glass which varies as the batch formula is changed. The molten material 26 may for example, be lead contained in a trough 27, the latter including supports 28 upon which the block sections rest with their edge portions projecting into the bath. It has been found that such a method of heating or reheating these edge portions very quickly brings about the desired condition in these areas without greatly affecting the temperature of the remaining portions of the block sections.

Upon obtaining a sufficient heating of these edge portions, the block sections are removed and placed one upon the other in a form 30 beneath a pressure head 31 or block as generally shown in Fig. 3. The assembled block rapidly cools to the point where an effective glass-to-glass bond is produced. The unit is then placed in an annealing leer wherein strains and stresses are removed from the structure and the block gradually cooled. Such cooling of the block, inasmuch as a hermetic seal has been effected, greatly reduces the internal air pressure so that a partial vacuum is produced. Thus a structure is obtained in which no moisture will collect so long as the sections remain hermetically sealed together.

Modifications may be resorted to within the spirit and scope of the appended claim.

We claim:

The method of effecting a glass-to-glass bond between molded glass parts which consists in dipping only those surfaces to be united and surfaces in close proximity thereto into a bath of molten material which will not adhere to the glass yet will render said surfaces semi-plastic and capable of adhesion to each other and bringing these surfaces together under pressure while still semi-plastic.

WILLARD P. ZIMMERMAN.
MINOT K. HOLMES.